United States Patent [19]

Koskinen et al.

[11] Patent Number: 5,215,949
[45] Date of Patent: Jun. 1, 1993

[54] METHOD AND EQUIPMENT FOR THE PREPARATION OF A CARRIER OF A POLYMERIZATION CATALYST

[75] Inventors: Jukka Koskinen, Espoo; Ismo Pentti, Kulloo, both of Finland

[73] Assignee: Neste Oy, Fulloo, Finland

[21] Appl. No.: 599,130

[22] Filed: Oct. 17, 1990

[30] Foreign Application Priority Data

Oct. 20, 1989 [FI] Finland ................................. 895015

[51] Int. Cl.⁵ ................................. C08F 4/02
[52] U.S. Cl. ................................. 502/5; 502/9; 502/10; 502/125; 502/134
[58] Field of Search .................. 502/5, 9, 10, 134, 125

[56] References Cited

U.S. PATENT DOCUMENTS

| | | | |
|---|---|---|---|
| 3,644,130 | 2/1972 | Evans et al. | 106/270 |
| 4,019,683 | 4/1977 | Asai et al. | 310/323 |
| 4,071,674 | 6/1978 | Kashiwa et al. | 526/125 |
| 4,421,674 | 12/1983 | Invernizzi et al. | 502/9 |
| 4,623,706 | 11/1986 | Timm et al. | 526/88 |
| 4,829,034 | 5/1989 | Iiskolan et al. | 302/9 |
| 4,871,489 | 10/1989 | Ketcham | 502/9 |

FOREIGN PATENT DOCUMENTS 56700 7/1982 European Pat. Off. .
158485 10/1985 European Pat. Off. .
862469 6/1986 Finland .
59-215301 12/1984 Japan .

*Primary Examiner*—Patrick P. Garvin
*Assistant Examiner*—Brent M. Peebles
*Attorney, Agent, or Firm*—Tilton, Fallon, Lungmus & Chestnut

[57] ABSTRACT

In conventional spraying methods the problem in the preparation of small carrier particles aimed for the polymerization is that the drops constituting the prestages of the particles agglomerate or form otherwise in different sizes, whereby the size distribution of the carrier particles becomes too broad. This leads due to the so-called replica phenomenon to a polymer product having also a too broad particle size distribution. In the present invention the carrier is prepared by spraying a liquid containing a carrier through a nozzle into inert gas so that its first forms small droplets, which then solidify to small carrier particles. The desired narrow particle size distribution is provided by feeding a liquid containing a carrier through a nozzle, in which or in connection with which the liquid drops by means of the standing sonic waves in the ultrasonic range into small droplets of uniform size. The droplets of uniform size solidify then into small carrier particles of equally uniform size.

11 Claims, 1 Drawing Sheet

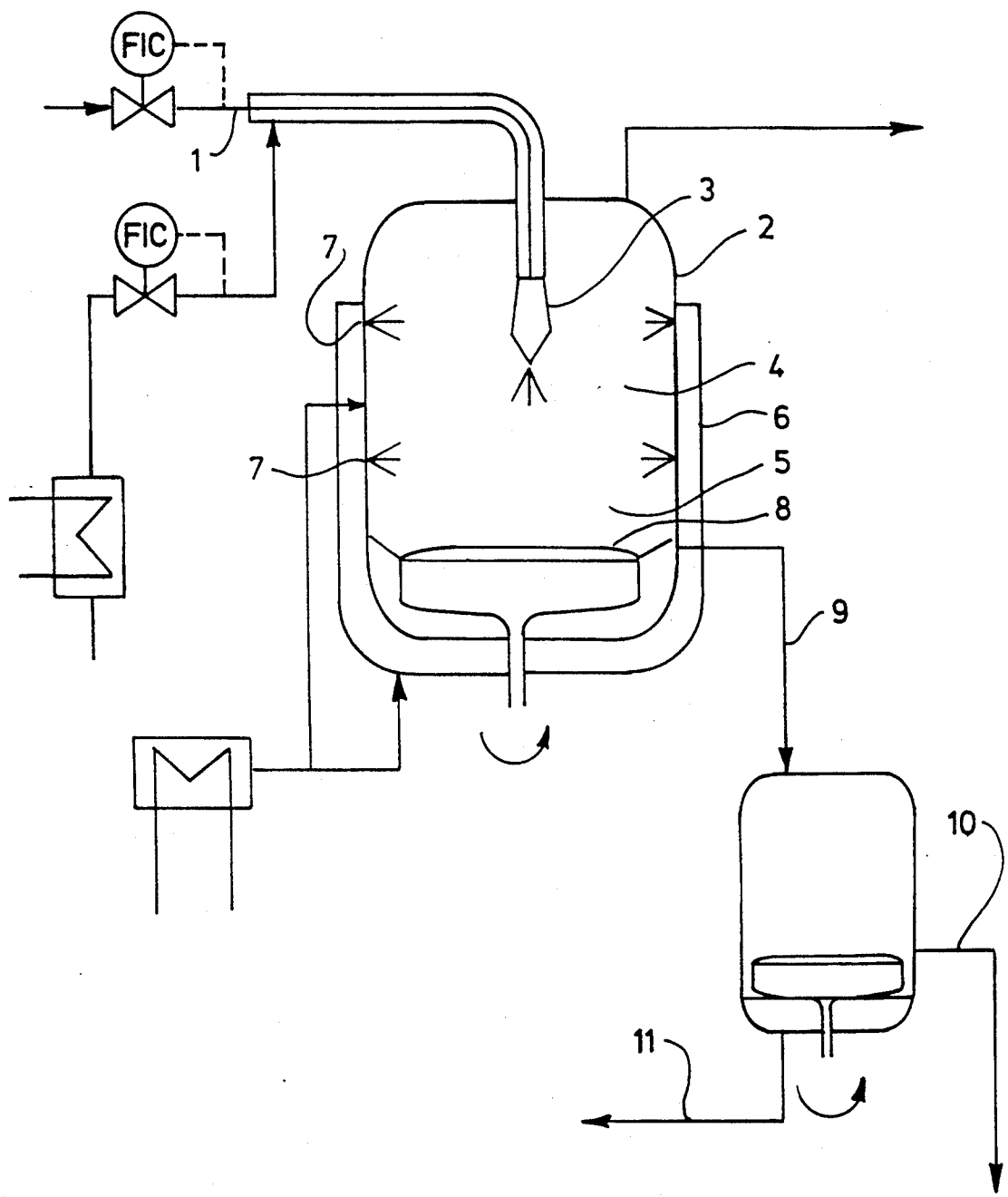

METHOD AND EQUIPMENT FOR THE PREPARATION OF A CARRIER OF A POLYMERIZATION CATALYST

The invention relates to a method for the preparation of a polymerization catalyst carrier by spraying a liquid containing a carrier through a nozzle into an inert gas so that it first forms small droplets which then solidify to small carrier particles. The invention also relates to an equipment for the preparation of a solid polymerization catalyst carrier, which comprises at least a nozzle for spraying the liquid containing a carrier into small droplets and spraying room filled with inert gas for receiving the small droplets and solidifying them into small carrier particles.

Polymerization catalysts, and Ziegler-Natta-type catalysts in particular, nowadays typically comprise an inert carrier, on which the actual active catalyst component or the mixture or the complex formed by the catalytic compounds are layered. The morphology and size distribution of such a carrier are of great significance for the activity of the catalyst and for the properties of the polymer obtained by the catalyst. It is, in fact, possible to produce polymers by means of active catalysts which are so pure that no catalyst residues need to be removed. The morphology of the carrier, on the other hand, influences the morphology of the polymer product itself as it has been noted that the morphology of the catalyst repeats itself in the structure of the polymer (the so-called replica phenomenon). When a fluid product polymer is wanted having a preferred morphology and a narrow particular distribution, which is desirable in view of the aimed use of many processing processes, the properties of the carrier shall, because of the replica phenomenon, be made similar.

The Ziegler-Natta-type catalysts at present typically comprise a magnesium or silica based carrier treated with a transition metal compound like a titanium halide and sometimes also with an electron donor compound. The knowledge also exists that the carrier can be brought to an advantageous crystal form being uniform in size by allowing it to crystallize as a complex of any one of its crystal solvents. Such a treatment of a carrier with a crystal solvent is presented e.g. in the U.S. Pat. No. 4,071,674, in which a procatalyst based on a transition metal compound has been prepared by reacting a titanium or vanadinum compound with a reaction product that has been produced when an adduct of a magnesium dihalide and an alcohol reacts with an organometallic compound of a metal of any of the groups I to III. The preparation of a procatalyst takes place by adding alcohol dropwise to a suspension of magnesium dihalide, after which organometallic compound is added dropwise to the reaction mixture. After agitation the preactivated carrier is activated by adding titanium tetrachloride to the reaction mixture. The adding stages of such a method are primitive and do not allow regulation of the morphology of the catalyst in the desired manner.

The treatment with a crystal solvent is also described in the patent application JP-59-215301. In this publication the corresponding carrier complex (10 g of $MgCl_2$ and 24.2 g ETOH) have been prepared by emulsion technique. The carrier complex melt has been dispersed in n-decane to spheroidal melt particles. After this the carrier particles in the emulsion have been shock solidified by transferring the emulsion into a cold hydrocarbon medium. A drawback of this method is, among others, that such components are needed in the preparation of the carrier which are of no use at the later stages of the preparation of the catalyst and this presupposes the existence of proper purification and recirculation equipments.

In a method according to the EP publication 56700 the titanium halide is reacted with a magnesium chloride catalyst carrier being in the form of microspheres, after which the reaction product particles are recovered by physical means and mixed with an organometallic compound. In the method the carrier is prepared by producing a solution that essentially contains magnesium dichloride dissolved in ethanol and carrying out after that a spray-drying of the solution by spraying it into a flow of nitrogen gas having high inlet and outlet temperatures. As a result spheroidal magnesium dichloride particles are obtained. In this method the high temperature evaporates a large part of the crystal solvent, whereby the activation capacity of the carrier decreases and the porosity increases.

According to patent application FI-862469 (Neste Oy) the above-mentioned carrier complex formed by the carrier and the crystal solvent can be melted to a clear liquid. By conducting such a liquid through a spray-nozzle into a spraying room cooled by cold nitrogen gas it crystallizes to small particles having a spheroidal carrier complex form and being very fluid and loose. Further, the carrier complex crystallizes without evaporation of the crystal solvent. Hereby, a nacreous, non-porous surface is obtained, which is particularly advantageous for the preparation of an active catalyst.

When such an activated carrier is brought into contact with titanium compounds, plenty of catalytically active complexes are formed on the surface of the carrier between the $MgCl_2$ and the titanium compound when the crystal solvent disappears.

The last-mentioned methods using the spraying technique lead to easily activated carrier compounds and complexes. A drawback in the spraying is, however, that the drops formed are not fully of uniform size.

An aim of the invention is to provide a method and an apparatus for the preparation of a polymerization catalyst carrier, which, simultaneously, lead to a maximally active catalyst and to catalyst particles of advantageous form and narrow size distribution. These goals have been achieved by a method for the preparation of a polymerization catalyst carrier being mainly characterized by the feataures disclosed in the characterizing clause of claim 1. Thus, it has been realized that when liquid containing a carrier is sprayed through a nozzle into inert gas, the spraying is carried out by feeding the liquid mentioned through a nozzle in which or in connection with which the liquid forms small droplets of uniform size by means of standing sonic waves in the range of ultrasonic waves. When the drops then solidify in the inert gas, they also become small carrier particles of uniform size.

When the spraying is carried out through an ultrasonic nozzle or similar, a carrier having a preferred morphology and a narrow particle distribution is obtained.

According to the present invention the carrier and the crystal solvent are brought into contact with each other in order to form a liquid containing a carrier. Then the carrier-containing liquid being in the form of a liquid, a solvate or a melt is transformed by physical means into small droplets of as uniform a size as possible. This may take place by spray-drying or -crystallizing into gas medium or it can take place by emulsion or suspension into liquid medium When on its widest the invention protects the use of ultrasound in all these methods to make the drop size distribution narrower.

According to a preferred embodiment of the invention ultrasonic waves are used in the nozzle spraying carrier-containing liquid. Hereby, an ultrasonic nozzle is preferably used having a vibration density of about 10 to 200 kHz, preferably in the order of about 30 kHz. The vibration effect is about 50 to 200 W, preferably in the order of about 100 W.

According to a embodiment of the invention the carrier containing liquid is sprayed from the nozzle into inert gas in the spraying room, wherein it first forms droplets and then is solidified. It is also advantageous to prepare the carrier so that the particles are formed by spray-crystallizing a mixture of the carrier and the crystal solvent to crystalline complex particles. The spray-crystallization is preferably carried out by heating the carrier solvated with a crystal solvent to a homogeneous carrier-containing liquid and spraying then the liquid by means of a hot spray gas into a cooled spraying room, where the carrier complex particles of the carrier and the crystal solvent are formed without essential evaporation of the crystal solvent. The spray-crystallization is carried out by using in regard to the reaction components inert gases, such as dry nitrogen. The carrier-containing liquid forms first droplets in the zone of the spraying room and then arrives to the solidification zone of the spraying room filled with cold inert gas, where it solidifies. At least a portion of the spraying room can, when necessary, be cooled by means of a heat exchange equipment and/or by conducting cooling inert gas and/or liquid medium into the spraying space.

If cooling liquid medium is conducted into the spraying room the carrier particles can immediately after the solidification be precipitated into said medium, whereby the sludge is preferably obtained by agitating with a mixer in the spraying room and/or by adding surface active substance.

A magnesium compound is preferably used as the carrier, most preferably magnesium dihalide and most preferably magnesium dichloride. The carrier must be anhydrous so that it will not react with titanium tetrachloride, which is susceptible to moisture, or the like. Advantageous solvents have been found to be alcohols and the most advantageous one dry (anhydrous) absolute ethanol. Ethanol forms with magnesium dichloride a crystalline complex $MgCl_2$ xaEtOH, wherein a is 1.6, preferably 2.6 and most preferably 3.5.

The magnesium dichloride-ethanol complex is preferably fed from the ultrasonic nozzle at a temperature of about 100° to 200° C., whereby it easily becomes atomized into small droplets of suitable size. The most suitable temperature is about 130° C. After the sprinkling it comes into contact with a cold medium flow having a temperature of about −20° to +20° C. and preferably −10° to +10° C. The nitrogen gas mentioned can be used as the medium, but also a light hydrocarbon, such as heptane, is suitable.

If liquid is used as the cooling medium, the finished carrier particles are obtained by separating them from this liquid.

Finally, the completed carrier particles are activated with a transition metal compound and optionally an electron donor for the preparation of the solid procatalyst of a Ziegler-Natta-catalyst.

The invention also relates to an equipment comprising essentially a nozzle and a spraying room, characterizing of which is that there is in the nozzle or in connection with it a vibrator for producing standing sonic waves in the ultrasonic range by means of which the carrier-containing liquid forms small droplets of uniform size. These drops then solidify in the spraying space into small carrier particles of equal size. The spraying room can be divided into a dropping zone, into which the carrier-containing liquid is sprayed into small droplets, and into a solidifying zone, in which the drops solidify into small carrier particles.

According to a preferred embodiment heating is arranged within the dropping zone, which e.g. takes place automatically by means of the hot inert gas flow coming from the nozzle of the carrier-containing liquid and/or IR-radiation.

The solidification zone of the spraying room can be cooled in many ways. Between the solidification zone and the dropping zone of the spraying room can be arranged separating means which prevent heat from transferring from the dropping zone to the solidification zone. Heat exchange surfaces can be arranged inside the solidification zone and around it can be installed a cooling mantle. Nozzles for feeding cold inert gas and/or fluid medium amongst the solidifying liquid can also be arranged in the solidification zone of the spraying room.

According to one embodiment a cold medium is arranged on the bottom of the spraying room, into which the settling carrier particles precipitate, preferably by means of a mixer. The carrier particles can also be emulgated in a cool medium by means of a surfaceactive substance.

Moreover, one or several aggregates and optionally one or several vessels can be arranged in connection with the equipment according to the invention for separating the cooling and transport medium from the finished carrier particles.

An equipment for the preparation of a carrier of a polymerization catalyst according to one embodiment of present invention is shown in the FIGURE having in aim to illustrate the present invention.

In the FIGURE the carrier-containing liquid, e.g. the carrier complex 1 being in melt form, is conducted to the spraying room 2 through an ultrasonic nozzle 3, wherein owing to standing sonic waves a drop spray is formed having a narrow drop size distribution. The drops created are blown further from the drop forming zone 4 of the spraying room 2 to its solidification zone 5 by means of hot inert gas. Also the members 3 of the nozzle for producing the ultrasonic waves, i.e. the vibration surfaces, are heated by inert gas so as to prevent the melt 1 from crystallizing already in the ultrasonic nozzle 3.

When the drop spray comes into the solidification zone of the spray room (2), the drops solidify when the temperature decreases so that also the solidified particles have a narrow size distribution.

The spraying room and preferably its solidification zone 5 can be cooled externally e.g. by circulating cold gas or liquid in the constructions of the spraying room 2 or in purpose-designed cooling equipments 6. Alternatively or in addition, the cooling can be arranged by conducting cold inert gas or solvent into the spraying room 2 through nozzles 7 at the bottom and/or the sides of it. When the carrier particles settle on the bottom of the spraying room 2, they form a sludge with the solved used as cooling medium or then solvent can be conducted into the spraying room for the creation of a sludge. The creation of a sludge can be promoted by means of the mixer 8.

The created sludge is removed e.g. through one or several aggregates 9 in the side of the spraying room 2. The carrier particles 10 are separated from the sludge and the particles can still be sieved to desired fractions. The solvent 11 obtained from the separation can be returned to the spraying room 2 and/or as the cooling medium of its cooling mantle 6.

An essential advantage of the spraying taking place by means of an ultrasonic nozzle in comparison with conventional methods, e.g. pressure atomization or the pneumatic spraying of a melt is that:

The amount of the inert gas fed into the nozzle in regard to the fed melt is small so that the solvent component of the carrier, such as ethanol, will not evaporate during the atomization. This is particularly suitable when the particles solidify by crystallization, because a small solvent concentration in a cold gas room cause increasing agglomeration of the crystallizing melt particles and clogging of the product, The drops created have a small velocity, whereby no whirling currents of the gas and particles, nor colliding or mixing of the melt fog and crystallized fog occur in the spraying room, which, too, decreases the crystallization of the particles onto each other.

An essential advantage of the ultrasonic atomizer in regard to conventional spraying equipments is its remarkably smaller size than what is normal in an equipment designed for the capacity concerned. Moreover, the crystallization can easily be carried out in over- or underpressure.

The prevention of the agglomeration of the particles can still be efficiently promoted by using surface active substances in the bottom of the reactor e.g. in the liquid phase formed by a hydrocarbon. The sludge formed by a hydrocarbon, preferably heptane, and a carrier provided by the method according to the invention can easily be wet screened for the particle size range desired, e.g. 20 to 70 micron meters.

In the following some examples are presented to illustrate the invention.

EXAMPLE 1

5 kg/h of $MgCl_2 * 3.5$ EtOH-complex in melt state and at a temperature of 130° C. was fed into the above-described spraying equipment (V=100 l) furnished with an ultrasonic atomerizer having at the bottom of it heptane at the temperature of 0° C. About 5 kg/h of nitrogen was fed to the ultrasonic nozzle to blow the fog off from the nozzle area. The temperature of the nitrogen was 130° C. The vibrating frequency was 30 kHz and the vibration effect 100 W. The vibrating elements were heated with a UV-radiation heater so as to prevent the crystallization of the fog on the vibrating surfaces.

The melt complex dropped and solidified into carrier particles of uniform size, which elutriated in the cold heptane at the bottom of the spraying room. The crystallized particles separated from the heptane sludge were spheroidal or had an oval form and their outer effective diameter $d_{32}$ was about 30 to 40 um and the width of the distribution SPAN was 1.3 (SPAN=(d(90%)−d(10%))/d(50%) defined with Malvern Master Sizer particle size analysator). The chemical composition of the particles remained the same during the spray crystallization process ($MgCl_2 * 3.5$ EtOH). Agglomeration of the particles was little.

A product sludge containing about 2 kg of the catalyst carrier was screened in a multi-function reactor according to the FI-patent application No. 881538, the bottom sieve size of which was 15 μm, and activation with titanium tetrachloride was carried out. The volume of the multi-function reactor was 80 liters. $TiCl_4$ having temperature of −10° C. was fed to the reactor with an agitation of 100 rpm. The temperature of the mixture was raised uniformly to 115° C. within 3 hours and 400 g of the inner donor DIBP was added when the temperature was +20° C. Agitation was still continued for 2 hours, after which the reaction solution and the catalyst were filtered apart. After this $TiCl_4$ having a temperature of 110° C. was fed to the reactor and the catalyst was washed for 2 hours, the stirring velocity being 400 rpm. After this the catalyst was again separated from the washing liquor and the catalyst was washed with heptane (60 liters) four times at 80° C. 2 h/wash. After the wash the catalyst was dried with nitrogen having the temperature of +70° C. and the mantle of the reactor was heated to +70° C. with hot oil. The drying time was 5 hours. The dried catalyst was removed from the reactor by means of vibration of nitrogen blowing. 800 g of finished catalyst was obtained and the analysis result of the catalyst was: Ti 3.0% by weight, Mg 17.8% by weight, Cl 56.4% by weight, heptane 22.3% by weight. The morphology of the catalyst remained unchanged during the activation and the wash. The sludge polymerization test of the catalyst (7 bar, 4 h, 70° C.) gave as the activity of the catalyst 15.6 kg PP/g of catalyst The isotactic index of the polymer was 97.1% and the bulk density of the polymer was 0.45 g/cm$^3$. The particle size distribution of the polymer particles was narrow.

EXAMPLE 2

As example 1, but the composition of the atomized melt was $MgCl_2 * 4.5$ EtOH.

EXAMPLE 3

As example 1, but the composition of the atomized melt was $MgCl_2 * 3.5$ EtOH 0.1 DIBP and in the activation stage no DIBP was added any more.

EXAMPLE 4

$MgCl_2 * 3.5$ EtOH complex was atomized with an ultrasonic atomizer at a temperature of 130° C. into a spray chamber delivered by Niro Atomizer. Melt was sprayed from the upper portion of the chamber into a cold (−5° C.) nitrogen flow. The drops were removed from the nozzle with a hot (130° C.) nitrogen flow. The dropping zone was isolated with a shield from the solidification zone used by the nitrogen flow so that the cold nitrogen would not crystallize melt on the vibrating surfaces of the ultrasonic atomizer.

The drops crystallized when they settled 3 meters in the cold nitrogen flow of the solidification zone. The spray crystallized spheroidal catalyst carrier particles were separated from the nitrogen flow by means of a cyclone. The spraying process was continuously working and 100 kg of the product was collected through the cyclone in 6 hours. The particles formed were freely flowable and no agglomeration occurred. The average particle size of the product was $d_{32}=40$ to 50 um and the width of the particle size distribution was narrow, SPAN=1.4 to 1.7. The chemical composition of the particles formed was the same as that of the carrier melt fed.

80 kg of the material in question ($MgCl_2 * 3.5$ EtOH) was activated washed and dried in a multi-function reactor delivered by Schenk Filterbau GMBH. The reactor was turnable and its one end was furnished for the screen wash and the other end for the activation and the drying phase. The volume of the reactor was 1.5 m$^3$.

80 kg of spray-crystallized catalyst carried was dosed into a nitrified reactor. 1000 liters of $TiCl_4$ cooled to a temperature of 10° C. was added to the reactor. The temperature was held at $-10°$ C. for the whole time of adding after which the mixture was agitated for 1 hour with the agitation rate 30 rpm. The temperature of the reaction mixture was raised to $+20°$ C. within 1 hour, after which 18 liters of inner donor DIBP was added. After this the temperature was raised to $+115°$ C. within 3 hours and the mixture was held at this temperature for 2 hours, after which the reaction solution was filtered through a screen. The screen type was metal sinter having the screen size 20 um. After the filtration 1000 liters of preheated $TiCl_4$ having the temperature $+90°$ C. was added to the reactor. The temperature was raised to $+110°$ C. and was kept there for 2 hours with the agitation 30 rpm, after which the solution was filtered away. The catalyst was washed with 1000 liters of heptane four times at a temperature of $+90°$ C. The washing time was 30 min./washing occasion. The catalyst produced was dried in the reactor by turning it around to a drying position at a temperature of $+60°$ C. for 6 hours. The hydrochloric gases created in the activation were conducted from the reactor through the oil lock into the gas washer.

The size and the morphology of the catalyst remained the same during the whole activation and wash. 40 kg of finished catalyst was obtained and the analysis result of the catalyst was: Ti 2.1% by weight, Mg 16.1% by weight, Cl 54.1% by weight. The sludge polymerization test of the catalyst (7 bar, 4 h, 70° C.) gave 14.8 kg of PP/g of catalyst as the activity of the catalyst. The isotactic index of the polymer was 96.0% and the bult density of the polymer was 0.45 g/m$^3$. The particle size distribution of the polymer particles was narrow.

We claim:

1. Method for preparing a polymerization catalyst carrier by spraying a liquid containing a carrier through a nozzle into inert gas so that it first forms small droplets, which then solidify to small carrier particles, the spraying being carried out by feeding the liquid containing a carrier through a nozzle in which said liquid by means of standing sonic waves in the ultrasonic range form small droplets of uniform size, which then solidify to small carrier particles of equally uniform size.

2. Method according to claim 1, wherein the spraying is carried out by means of an ultrasonic nozzle having a vibration density of about 10 to 200 kHz and/or the vibration effect is about 50 to 200 W.

3. Method according to claim 1 or 2, wherein the liquid containing a carrier is sprayed through a nozzle into inert gas in a spraying room, and wherein it first forms droplets and then solidifies.

4. Method according to claim 3, wherein the liquid containing a carrier is first sprayed from the nozzle by means of hot inert gas into the drop forming zone of the spraying room, where it forms droplets and then is conducted into a solidifying zone of the spraying room filled with cold inert gas where it solidifies.

5. Method according to claim 1, wherein at least a portion of the spraying room is cooled by means of a heat exchange equipment and/or by conducting cooling inert gas and/or liquid medium into the spraying room.

6. Method according to claim 5, wherein the carrier particles are removed from the spraying room sludged in the cooling medium, whereby the sludge is advantageously obtained by mixing the carrier particles and the cooling medium by means of a mizer in the spraying room and/or by adding surface-active medium.

7. Method according to any one of claims 4, 5, or 6, wherein it is carried out as spray-crystallization so that the warm melt acting as the carrier containing liquid is at least partly crystallized by conducting it into the inert gas, which has been cooled.

8. Method according to claim 1, wherein an essentially homogenous melt of magnesium dihalide, and a crystal solvent, which is an aliphatic monohydric alcohol, is used as the carrier containing liquid.

9. Method according to claim 1, wherein the finished carrier particles are activated with a transition metal compound and optionally an electron donor to prepare a solid procatalyst component of the Ziegler-Natta-catalyst.

10. Method according to claim 2, wherein said vibration density is approximately 30 kHz, and said vibration effect is approximately 100 W.

11. Method according to claim 8, characterized in that the magnesium dihalide is $MgCl_2$ and the crystal solvent is $C_2H_5OH$.

* * * * *

UNITED STATES PATENT AND TRADEMARK OFFICE
CERTIFICATE OF CORRECTION

PATENT NO. : 5,215,949

DATED : Jun. 1, 1993

INVENTOR(S) : Koskinen et al.

It is certified that error appears in the above-identified patent and that said Letters Patent is hereby corrected as shown below:

Column 6, line 28, delete "17. 8" and insert --17.8--.
Column 8, line 27, delete "mizer" and insert --mixer--.

Signed and Sealed this

Ninth Day of November, 1993

*Attest:*

BRUCE LEHMAN

*Attesting Officer*  *Commissioner of Patents and Trademarks*